United States Patent [19]

Watanabe

[11] 4,311,744
[45] Jan. 19, 1982

[54] PANEL REINFORCEMENT STRUCTURES FOR AUTOMOBILE BODIES

[75] Inventor: Kinji Watanabe, Hiroshima, Japan

[73] Assignee: Toyo Kogyo Co., Ltd., Hiroshima, Japan

[21] Appl. No.: 124,922

[22] Filed: Feb. 26, 1980

[30] Foreign Application Priority Data

Feb. 28, 1979 [JP] Japan ................... 54-23727

[51] Int. Cl.³ ............... B32B 15/08; B32B 15/04; B32B 3/06
[52] U.S. Cl. ................... 428/83; 296/188; 296/210; 428/160; 428/172; 428/174; 428/189; 428/209; 428/462; 428/463; 428/308.4; 428/317.1; 428/319.1
[58] Field of Search ............... 428/158-160, 428/189, 195, 311, 315, 313, 322, 174, 172, 209, 83, 462, 463; 296/76, 188, 210, 211, 214; 180/69 R

[56] References Cited

U.S. PATENT DOCUMENTS 2,974,078 3/1961 Petritz et al. .................. 296/210
3,185,266 5/1965 Hofmeister ..................... 296/210

FOREIGN PATENT DOCUMENTS 2518978 11/1975 Fed. Rep. of Germany ...... 428/313

*Primary Examiner*—Paul J. Thibodeau
*Attorney, Agent, or Firm*—Fleit & Jacobson

[57] ABSTRACT

Panel reinforcement structure for automobile bodies including a wide outer skin such as a roof panel, a bonnet and a trunk lid, and one or more reinforcement members for applying the skin with a rigidity. The reinforcement member is applied to the outer skin with one or more layers of a mastic sealant. A layer of open cell type elastic foamed material is provided between the mastic sealant layer and one or each of the outer skin and the reinforcement member for the purpose of allowing a relative movement between the outer skin and the reinforcement member to avoid any distortion of the outer skin due to a difference in thermal expansion.

10 Claims, 3 Drawing Figures

U.S. Patent
Jan. 19, 1982
4,311,744
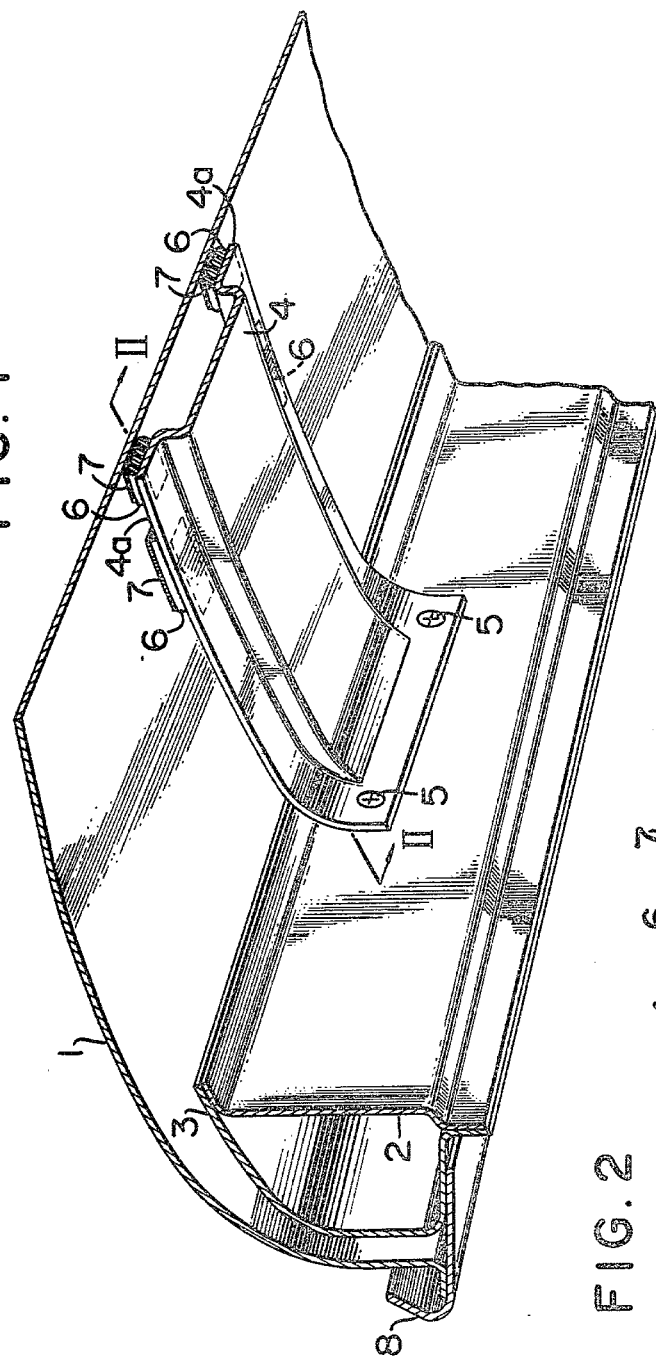
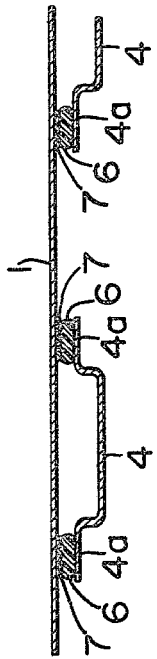
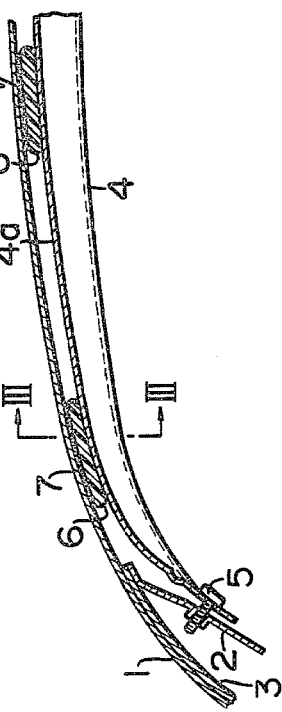

PANEL REINFORCEMENT STRUCTURES FOR AUTOMOBILE BODIES

The present invention relates to automobile body reinforcement structures and more particularly to panel reinforcement structures for automobile bodies.

In general, automobile bodies include such portions as roof panels, bonnets and trunk lids that have wide outer skins of relatively small curvatures. In order to provide such wide outer skins with required rigidity, conventional structures include reinforcement members extending across the inner surfaces of the skins with interventions of layers of a filling agent comprised of a so-called mastic sealing agent between the outer skins and the reinforcement members. The mastic sealing agent is firmly adhered both to the skin and the reinforcement member in the course of electrodepositing process. Therefore, when the assembly having such outer skin is taken out of the heating furnace in the electrodepositing process and the skin is rapidly cooled to cause a temperature difference between the skin and the reinforcement member, the resultant difference in thermal expansion between the outer skin and the reinforcement member produces distortions in the outer skin.

In order to avoid such problem, a thin sheet such as a paper may be interposed between the layer of the filling agent and the outer skin or the reinforcement member so as to allow a relative movement between the outer skin and the reinforcement member. However, the solution is not satisfactory because, due to the interposition of the thin sheet, it becomes impossible to form an electrodeposition coating on the metal surface facing to the sheet. Thus, the metal surface is not provided with a satisfactory corrosion resistant property, so that corrosions may be produced in use.

It is therefore an object of the present invention to provide a panel reinforcement structure for automobile bodies in which problems of distortion of outer skins can be overcome.

Another object of the present invention is to provide a panel reinforcement structure including a reinforcement member attached to an outer skin with an intervention of a filler material in such a manner that a relative movement between the reinforcement member and the outer skin is allowed.

A further object of the present invention is to provide a panel reinforcement structure which does not have any adverse effect on the corrosion resistant property.

According to the present invention, in order to accomplish the above and other objects, there is provided a panel reinforcement structure including an outer skin and at least one reinforcement member extending along the outer skin, at least one layer of filler agent provided between the outer skin and the reinforcement member, a layer of an open cell elastic foamed material provided between the filler agent layer and at least one of the outer skin and the reinforcement member. The filler agent is of a type that is called as a mastic sealant. Known types of mastic sealants include those based on vinyl chloride sol and those based on chloroprene including various kinds of additives. When the panel assembly comprised of the outer skin and the reinforcement member is subjected to an electrodepositing process, it is applied with heat in the final step for the purpose of aging and drying the coated material. Where the mastic sealant is of a type based on the vinyl chloride sol, the sealant is gelatinized under the heat which is applied thereto in the electrodepositing process and firmly adhered to the adjacent metal surface. Where the sealant is of a type based on the chloroprene, the solvent in the sealant is vaporized and the sealant is cured and firmly adhered to the adjacent metal surface.

According to the features of the present invention, however, at least one of the outer skin and the reinforcement member is separated from the layer of the filling agent by the elastic layer of the open cell material, so that relative movement is allowed between the outer skin and the reinforcement member. Since the elastic layer is of an open cell structure, the electrodeposition liquid can reach the metal surface to produce a coating layer. Further, the panel assembly is proceeded to a heating process with the elastic layer infiltrated with the electrodeposition liquid so that a corrosion resistant coating can be formed on the metal surface. The foamed material for the elastic layer must be of such a type that has a heat resistant property so that it can withstand the heat which is applied thereto in the aging step of the electrodeposition process. Further, the foaming rate of the material should be as high as possible from the viewpoint of providing a satisfactory corrosion resistant property. A recommendable material for the elastic layer is a urethane based foaming material.

In order to provide a sufficient freedom of relative movement between the outer skin and the reinforcement member, the thickness of the elastic layer should be as large as possible. However, since the elastic layer has a tendency of absorbing humidity, the thickness should be limited from the viewpoint of corrosion resistance.

BRIEF DESCRIPTION OF THE DRAWINGS

The above and other objects and features of the present invention will become apparent from the following descriptions of a preferred embodiment taking reference to the accompanying drawings, in which:

FIG. 1 is a fragmentary perspective view of a roof structure of an automobile body as seen from the inside of the body;

FIG. 2 is a sectional view taken substantially along the line II—II in FIG. 1; and FIG. 3 is a sectional view taken substantially along the line III—III in FIG. 2.

DESCRIPTION OF THE PREFERRED EMBODIMENT

Referring now to the drawings, the roof structure of the automobile body shown therein includes a roof panel 1 which generally covers the top portion of the body. Along each side of the roof panel 1, there is provided a roof rail of a closed cross-section comprising an inner rail member 2 and an outer rail member 3 which are welded together. A rain trough member 8 is also provided along each side of the roof panel 1.

Across the roof rails at the opposite sides of the roof panel 1, there are extending transverse reinforcement members 4 which are provided for applying the roof panel 1 with rigidity. The member 4 is generally of a shallow inverted U-shaped cross-section having side flanges 4a and has opposite ends secured to the inner rail members 2 of the roof rail by means of screws 5. Between the roof panel 1 and the flanges 4a of the reinforcement member 4, there are provided layers 6 of a filler agent which may be a mastic sealant. The layers 6 on each side flange 4a are spaced apart from each other along the length of the reinforcement member 4, however, a single layer of mastic sealant may be provided substantially throughout the length of the reinforcement member 4.

The layer 6 is in direct contact with the reinforcement member 4 but another layer 7 of an open cell foamed elastic material is provided between the roof panel 1 and the layer 6. Alternatively, the layer 7 may be provided between the reinforcement member 4 and the layer 6, or at each side of the layer 6. When the assembly is subjected to an electrodeposition process including a final heating step for aging, the material in the layer 6 is cured and firmly adhered to the reinforcement member 4. After the assembly is moved out of the heating furnace, the roof panel 1 will be cooled faster than the reinforcement member 4 so that there will be produced a temperature difference which causes a difference in the thermal expansion in the roof panel 1 and the reinforcement member 4. However, since the layers 7 of foamed elastic material permit relative movement between the roof panel 1 and the reinforcement member 4, such difference in thermal expansion does not cause any distortion in the roof panel 1.

The invention has thus been shown and described with reference to a specific embodiment, however, it should be noted that the invention is in no way limited to the details of the illustrated structures but changes and modifications may be made without departing from the scope of the appended claims.

I claim:

1. A panel reinforcement structure for automobile bodies having an outer skin metal member forming an outer covering body panel, the body panel having an inner surface, said reinforcement structure comprising:
    a reinforcement metal member reinforcing said outer skin metal member, and having two portions adapted to be fastened to the automobile body and an attaching surface opposed to and spaced from the inner surface of the outer skin metal member when said reinforcement metal member is fastened to the automobile body;
    a filler agent layer between the inner surface of the outer skin metal member and the attaching surface of the reinforcement metal member;
    a layer of foamed material between the filler agent layer and at least one of the outer skin metal member and the reinforcement metal member; and
    a corrosion resistant coating layer formed on the inner surface of the outer skin member by electrodeposition material, said layer of foamed material having open cell structure so that electrodeposition material can reach the inner surface of the outer skin member.

2. A panel reinforcement structure in accordance with claim 1 in which a plurality of said filler agent layers are provided in spaced apart relationship along a length of the reinforcement metal member, a layer of open cell foamed material being associated with each of the filler agent layers.

3. A panel reinforcement structure in accordance with claim 2 in which the reinforcement metal member is of a shallow U-shaped cross section having side flanges, the filler agent layers being provided only between each flange of the reinforcement metal member and the inner surface of the outer skin metal member.

4. A panel reinforcement structure in accordance with claim 2 in which the outer skin metal member is a roof panel.

5. A panel reinforcement structure in accordance with claim 1 in which the layer of open cell foamed material is provided between the filling agent layer and the outer skin metal member.

6. A panel reinforcement structure in accordance with claim 1 in which said filler agent is a vinyl chloride sol based sealant.

7. A panel reinforcement structure in accordance with claim 1 in which said filler agent is a chloroprene based sealant.

8. A panel reinforcement structure in accordance with claim 1 in which the foamed material is of a urethane based type.

9. A panel reinforcement structure in accordance with claim 2 in which the foamed material is of a urethane based type and the filling agent layer is made of chloride sol based material, the foamed material being provided between the outer skin metal member and filling agent layer.

10. A panel reinforcement structure in accordance with claim 2 in which the foamed material is of a urethane based type and the filling agent layer is made of chloroprene based material, the foamed material being provided between the outer skin metal member and the filling agent layer.

* * * * *